(12) United States Patent
Weder et al.

(10) Patent No.: US 7,935,745 B2
(45) Date of Patent: May 3, 2011

(54) SELF-ASSEMBLED NANOFIBER TEMPLATES; VERSATILE APPROACHES FOR POLYMER NANOCOMPOSITES

(75) Inventors: Christoph Weder, Shaker Heights, OH (US); Jeffrey Capadona, North Ridgeville, OH (US); Otto van den Berg, Grembergen (BE)

(73) Assignee: Case Western Reserve University, Cleveland, OH (US)

( * ) Notice: Subject to any disclaimer, the term of this patent is extended or adjusted under 35 U.S.C. 154(b) by 333 days.

(21) Appl. No.: 12/079,264

(22) Filed: Mar. 26, 2008

(65) Prior Publication Data

US 2008/0242765 A1    Oct. 2, 2008

Related U.S. Application Data

(60) Provisional application No. 60/920,335, filed on Mar. 27, 2007.

(51) Int. Cl.
*C08K 3/04* (2006.01)
*C08L 1/00* (2006.01)

(52) U.S. Cl. ........ 523/201; 523/215; 523/218; 523/333; 524/496; 524/35; 528/491; 977/742; 977/778

(58) Field of Classification Search .................. 523/201, 523/215, 218, 333; 524/496, 35; 528/491
See application file for complete search history.

(56) References Cited

U.S. PATENT DOCUMENTS

| 5,691,054 | A  | * | 11/1997 | Tennent et al. | ............... | 428/359 |
| 6,712,917 | B2 | * | 3/2004  | Gash et al.    | ................. | 149/19.92 |
| 7,001,556 | B1 | * | 2/2006  | Shambaugh      | ............... | 264/210.6 |
| 2003/0092342 | A1 | * | 5/2003 | Tennent et al. | ............... | 442/349 |
| 2006/0155376 | A1 | * | 7/2006 | Asgari         | ..................... | 623/16.11 |
| 2007/0197708 | A1 | * | 8/2007 | Jin et al.     | ........................ | 524/439 |
| 2007/0216067 | A1 | * | 9/2007 | Bahr et al.    | ................. | 264/328.1 |
| 2008/0146701 | A1 | * | 6/2008 | Sain et al.    | ......................... | 524/9 |
| 2008/0176740 | A1 | * | 7/2008 | Ma et al.      | ........................ | 502/177 |
| 2009/0200517 | A1 | * | 8/2009 | El Bounia      | ..................... | 252/500 |

* cited by examiner

*Primary Examiner* — Tae H Yoon
(74) *Attorney, Agent, or Firm* — Hudak, Shunk & Farine Co. LPA

(57) ABSTRACT

Polymer nanocomposites, nanoparticle-containing organogels utilized in forming the polymer nanocomposites, and methods for forming the polymer nanocomposites and nanoparticle-containing organogels are disclosed. Relatively simple and versatile methods are utilized to form the polymer nanocomposites. The process is based on the format of a three-dimensional network of well-individualized nanoparticles, such nanofibers through gelation thereof with an appropriate non-polymeric solvent. The nanoparticle-containing organogel is subsequently filled with a solution of a desired matrix polymer, the composite is dried and compacted to create the polymer nanocomposite. Polymer nanocomposites can be prepared which exhibit dramatic changes in mechanical properties, such as increased shear modulus, when compared to the neat polymer.

20 Claims, 16 Drawing Sheets

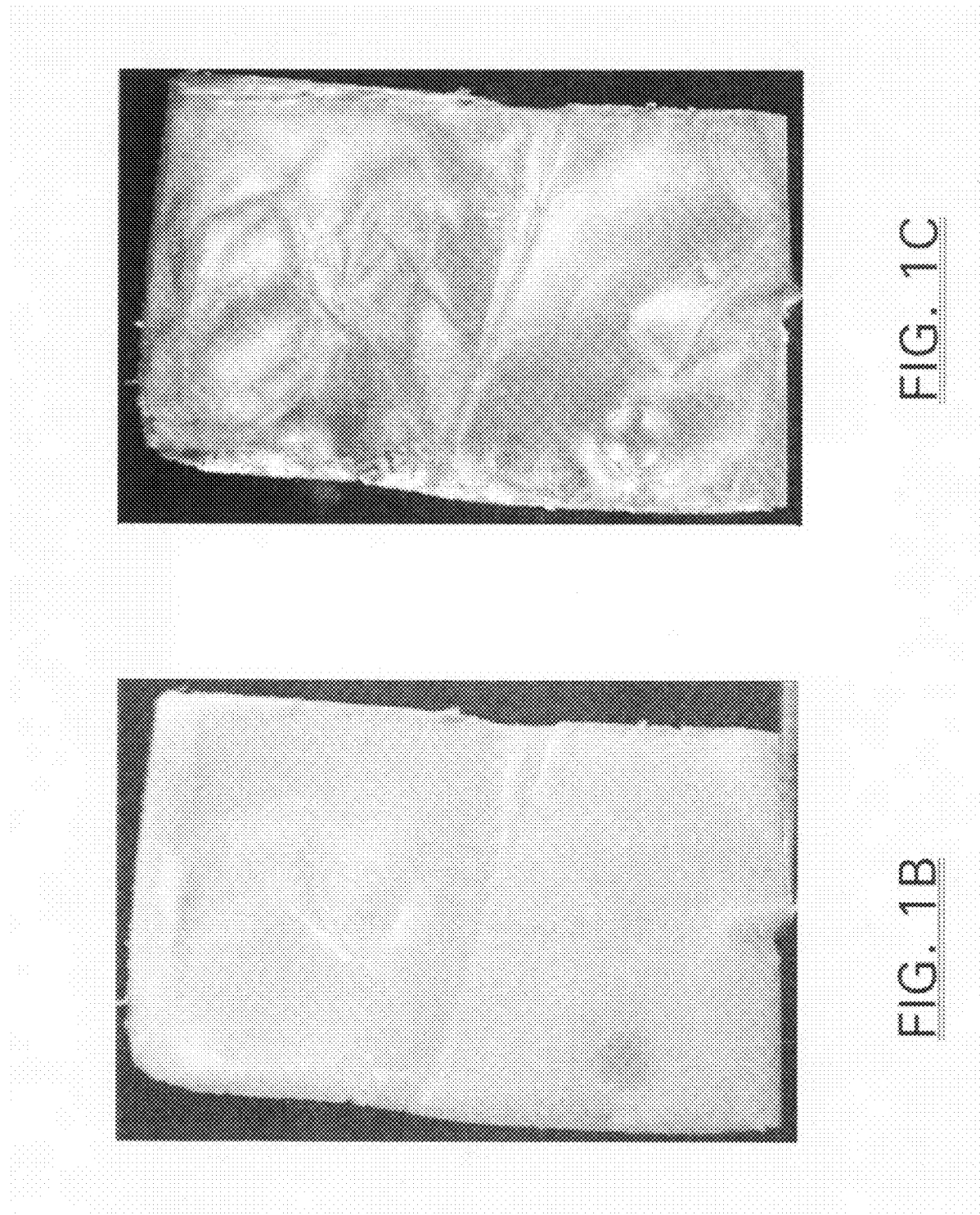

US 7,935,745 B2

SELF-ASSEMBLED NANOFIBER TEMPLATES; VERSATILE APPROACHES FOR POLYMER NANOCOMPOSITES

This application claims the benefit of U.S. Provisional Application Ser. No. 60/920,335, filed Mar. 27, 2007, which is incorporated by reference herein its entirety.

FIELD OF THE INVENTION

The present invention relates to polymer nanocomposites, nanoparticle-containing organogels utilized in forming the polymer nanocomposites, and methods for forming the polymer nanocomposites and nanoparticle-containing organogels. Relatively simple and versatile methods are utilized to form the polymer nanocomposites. The process is based on the format of a three-dimensional network of well-individualized nanoparticles, such as nanofibers through gelation thereof with an appropriate non-polymeric solvent or polymer containing solvent, depending on the embodiment. The nanoparticle-containing organogel is subsequently filled with a solution of a desired matrix polymer, the composite is dried and optionally compacted to create the polymer nanocomposite. Polymer nanocomposites can be prepared which exhibit dramatic changes in mechanical properties, such as increased tensile or shear modulus, when compared to the neat polymer.

BACKGROUND OF THE INVENTION

Nanocomposites that are produced by the mixing of organic or inorganic nano-particles with polymers continue to attract widespread interest in all areas of materials science. The general design approach is exceedingly attractive, since it allows for the fabrication of materials with new or improved properties by simply mixing the two constituents and exploiting synergistic effects between them. One important technological thrust is the development of structural materials with improved mechanical and/or thermal characteristics. Equally intriguing is the possibility of creating advanced functional materials with unique optic and/or electronic properties, catalytic activity, selective permeation and a plethora of other interesting features. However, the broad technological exploitation of polymer nanocomposites is stifled by the lack of effective methods for controlling the particle dispersion. As a consequence of their large specific surface area and high surface energy, nanoparticles usually have a strong tendency for aggregation. The main approach to suppress this effect is surface functionalization, which mediates particle-particle and particle-polymer interactions and can significantly influence the spatial distribution of the nanofiller. Unfortunately, the advantages of surface groups are often negated by the fact that they tend to 'insulate' the nanoparticles from each other by reducing or fully suppressing desirable interactions which can greatly reduce any benefits associated with their presence.

In view of the above, it would be desirable to provide methods and resulting materials wherein the interaction between nanoparticles and/or nanoparticles and polymers are nurtured, thereby providing benefits such as improved material properties, such as shear modulus.

SUMMARY OF THE INVENTION

The incorporation of nanoparticles into matrix polymers is a design approach that is used in virtually all areas of materials science to create materials with new or improved properties. Due to strong inter-particle interactions it is, however, often difficult or impossible to achieve full particle dispersion, which compromises the properties of interest. The present invention discloses various methods for the formation of homogeneous polymer/nanofiber composites. The processes are based on the formation of a three-dimensional network of well-individualized nanofibers through their gelation in an appropriate non-polymeric solvent or a polymer containing solvent, depending on the embodiment. This stable gel scaffold is subsequently filled with a solution of a desired matrix polymer, before the nanocomposite is dried and compacted. Through the creation of various new nanocomposites, it is demonstrated that these approaches allow for the fabrication of percolating nanocomposites of otherwise immiscible components.

Simple and versatile strategies for the formation of polymer nanocomposites are disclosed in embodiments of the invention, which are comprised of a three-dimensional network of well-individualized nanofibers such as shown in FIG. 1A. This percolating architecture is relevant to a broad range of materials in which good transport (e.g. thermal, electrical, or mechanical) is needed. In one embodiment, the approach was employed for the fabrication of nanocomposites containing cellulose nanofibers. In one embodiment, the so-called cellulose nanofibers "whiskers" were utilized, which offer intriguing properties, are readily obtained from renewable biomass, and have therefore attracted significant attention. Cellulose whiskers can be extracted from diverse biocomposites such as wood, cotton, or certain animals; the whiskers used herein in one embodiment were isolated from sessile sea creatures known as tunicates. Controlled hydrolysis of the tunicate mantles with strong acids affords almost defect-free cellulose crystals with a diameter of ca. 26 nm, a length of ca. 2.2 µm, and an elastic modulus (E) of ca. 140 GPa. Owing to the abundance of strongly interacting surface hydroxyl groups, tunicate whiskers have a strong tendency for aggregation. Their dispersibility is improved if sulfuric acid, for example, is used for the hydrolysis. This commonly used protocol introduces a small number (84 mmol/Kg) of negatively charged sulfate surface groups by way of esterification. The resulting electrostatic repulsion allows for the dispersion of tunicate whiskers in only a few polar solvents. Since traditional processing requires the mixing of such dispersions with polymer solutions or latexes in the same solvents the introduction of unmodified whiskers is believed limited to highly polar matrix polymers. The approaches of the present invention can overcome this limitation and is adaptable to other materials systems that suffer from similar processing limitations.

BRIEF DESCRIPTION OF THE DRAWINGS

The invention will be better understood and other features and advantages will become apparent by reading the detailed description of the invention, taken together with the drawings, wherein:

FIG. 1B is an image of a cellulose whisker aerogel, prepared by supercritical extraction of a whisker acetone gel and with a whisker density of 15 mg/mL.

FIG. 1C is the same object as in FIG. 1B, imaged through crossed polarizers.

DETAILED DESCRIPTION OF THE INVENTION

The polymer nanocomposites are derived in one embodiment of the present invention from a process that includes the steps of providing nanoparticles and forming a three-dimensional network of preferably well-individualized or dispersed nanoparticles through gelation in an appropriate non-polymeric solvent.

Numerous different types of nanoparticles can be utilized in the present invention. Generally any nano-size particles can be utilized. In one embodiment, nanoparticles that can disperse substantially fully in at least one solvent system are preferred. Nanoparticles must have particle-particle interactions which include, but are not limited to, hydrogen bonding, ionic charges, hydrophobic interactions, or pi-pi stacking. For example, nanoparticles suitable for use in the present invention include, but are not limited to, nanofibers, for example cellulose-based whiskers; carbon nanotubes and nano-size platelet materials, such as certain clays, or a combination thereof. In a preferred embodiment, the nanoparticles have a relatively high aspect ratio (L/d), such as about 5 or more, preferably 10 or more, more preferably 20 or more, and most preferably 50 or more. Nanofibers are preferred nanoparticles in one embodiment.

Figure 1A:
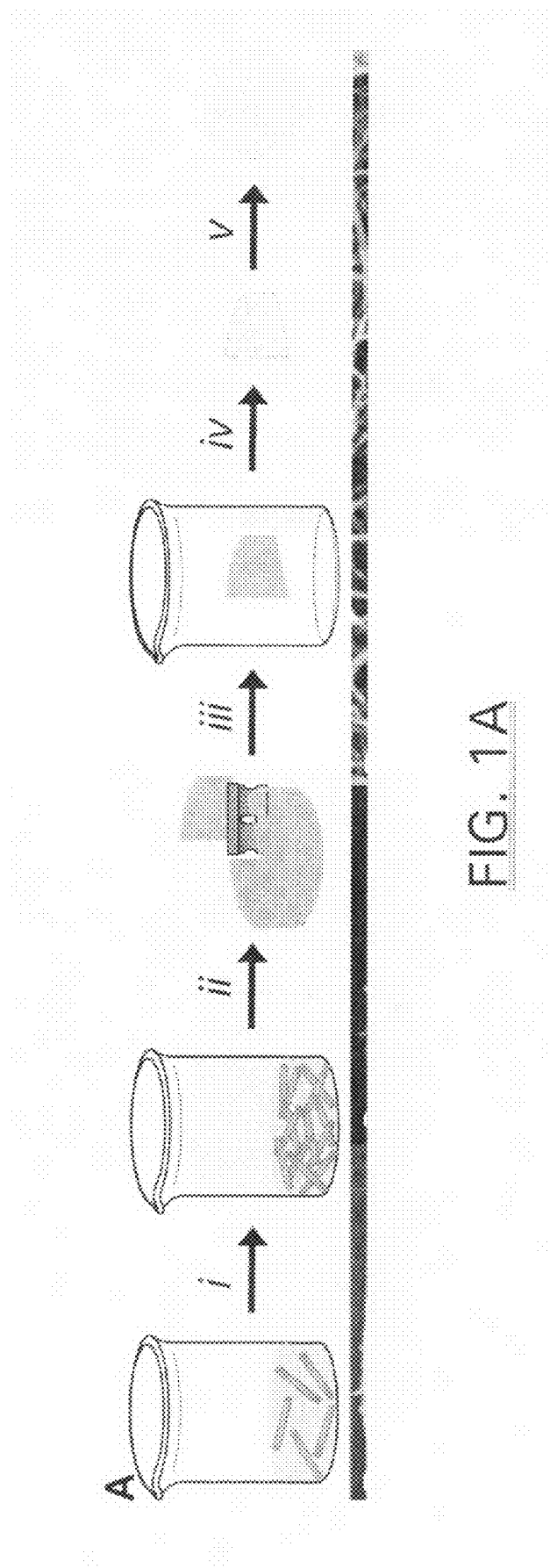
FIG. 1A is a schematic of the template approach to well-dispersed polymer/nanofiber composites, wherein (i) a nonsolvent is added to a nanofiber dispersion in the absence of any polymer, wherein (ii) solvent exchange promotes the self-assembly of a nanofiber gel, wherein (iii) the gelled nanofiber scaffold is imbibed with a polymer by immersion in a polymer solution before the nanocomposite is dried (iv) and compacted (v).
Figure 4:
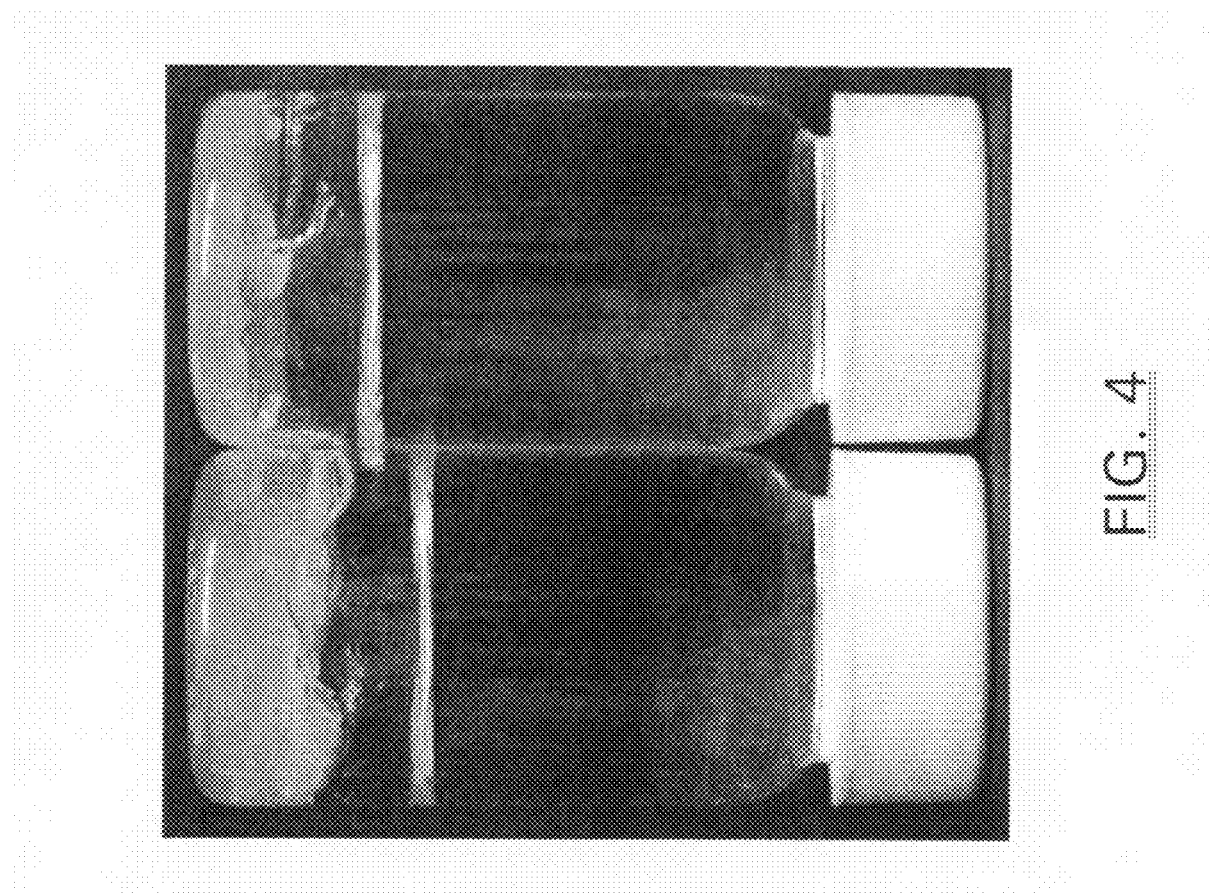
FIG. 4 is an image of cellulose whisker organogels prepared by solvent exchange of an aqueous whisker suspension (3.0 mL, whisker concentration=8.0 mg/mL) with 15 mL of acetone (left) or isopropanol (right).

A nanofiber network is formed utilizing the nanoparticles, preferably through a sol/gel process, such as illustrated in FIG. 1A. For example, in the case of tunicate whiskers, this involves the formation of a homogeneous whisker dispersion in a medium, such as water, such as taught by M. M. de Souza Lima, R. Borsali R., *Macromol. Rapid Commun.* 25, 771 (2004); M. A. S. A. Samir, F. Alloin, A. Dufresne, *Biomacromolecules* 6, 612 (2005); R. H. Marchessault, F. F. Morehead, N. M. Walter, *Nature* 184, 632 (1959); A. Sturcova, J. R. Davies, S. J. Eichhorn, *Biomacromolecules* 6, 1055 (2005); and O. van den Berg, J. R. Capadona, C. Weder, *Biomacromolecules* 8, (2007), herein incorporated by reference. Sonication or other methods of dispersion such as stirring or high shear mixing can be used to disperse the nanoparticles in a preferred embodiment. Following whisker dispersion, a whisker gel was formed through solvent exchange with a solvent that is medium-miscible, such as water-miscible, but does not disperse the whiskers, see FIG. 4. Various water-miscible solvents known in the art can be utilized including, but not limited to, acetone, methanol, tetrahydrofuran, ethanol, acetonitrile, dioxane and isopropanol, or a combination thereof. Table 1 sets forth whisker content in organogels prepared by solvent exchange between an aqueous dispersion containing 0.8% w/w of cellulose whiskers (3 mL) with organic solvents as indicated (15 mL).

TABLE I

| Solvent | Whisker Content in Organogel (% w/w) |
| --- | --- |
| Methanol | 1.01 ± 0.09 |
| Acetone | 1.39 ± 0.04 |
| Tetrahydrofuran | 1.43 ± 0.09 |

TABLE I-continued

| Solvent | Whisker Content in Organogel (% w/w) |
|---|---|
| Ethanol | 1.49 ± 0.17 |
| Acetonitrile | 1.58 ± 0.17 |
| Isopropanol | 1.81 ± 0.02 |

The whisker content of the gels can be controlled over a broad range by the concentration of the initial whisker dispersion, the volume ratio of organic solvent to whisker dispersion, wherein more solvent leads to lower whisker content, and the nature of the solvent, i.e., the solvation energy thereof.

Figure 1D:
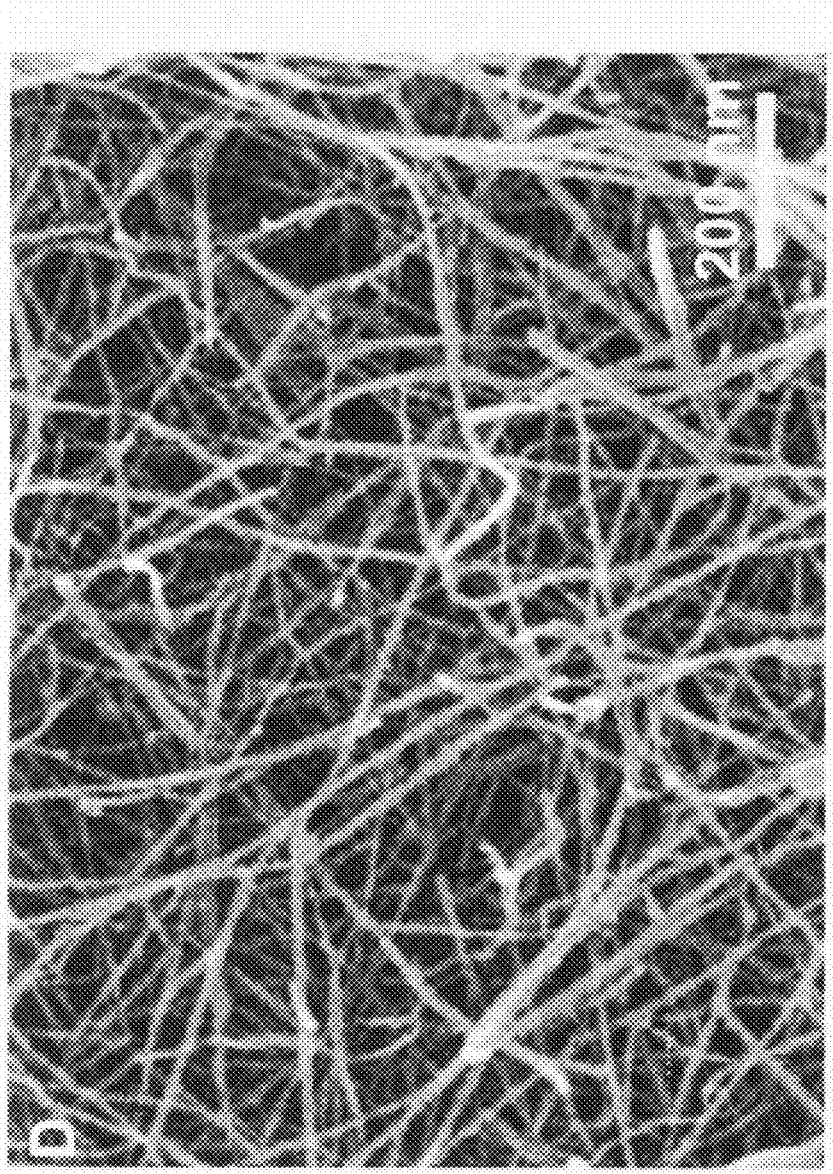
FIG. 1D illustrates scanning electron microscopy (SEM) image of a portion of FIB. 1B (scale bar=200 nm).
Figure 5:
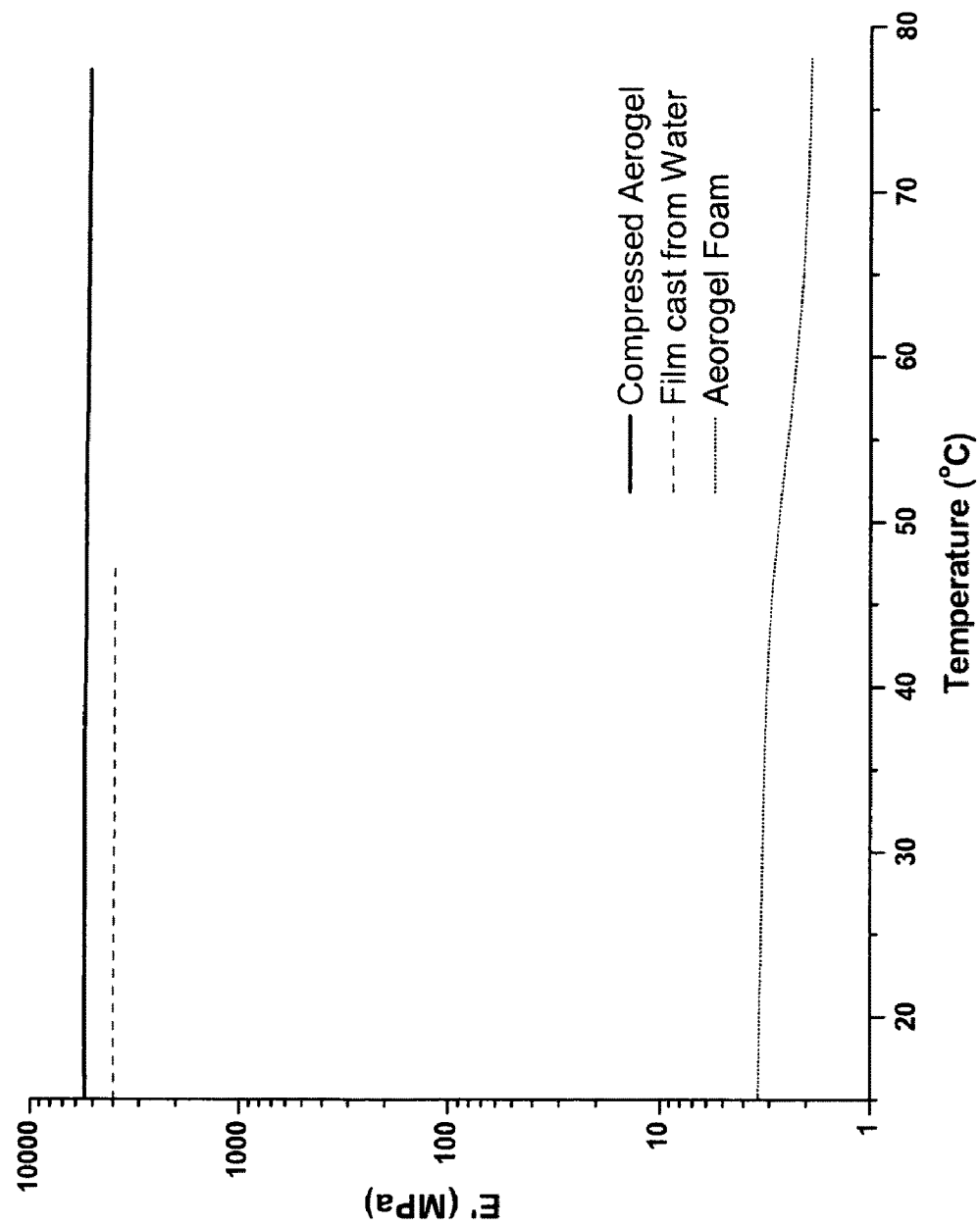
FIG. 5 shows DMTA traces of a cellulose whisker aerogel prepared by supercritical extraction of acetone gel (dotted line), a dense cellulose whisker film prepared by compressing the aerogel for 30 seconds at 6000 psi and ambient temperature into a thin film (solid line), and a whisker film cast from an aqueous dispersion (whisker content 8.0 mg/mL) and dried in vacuum (dashed line).
Figure 6:
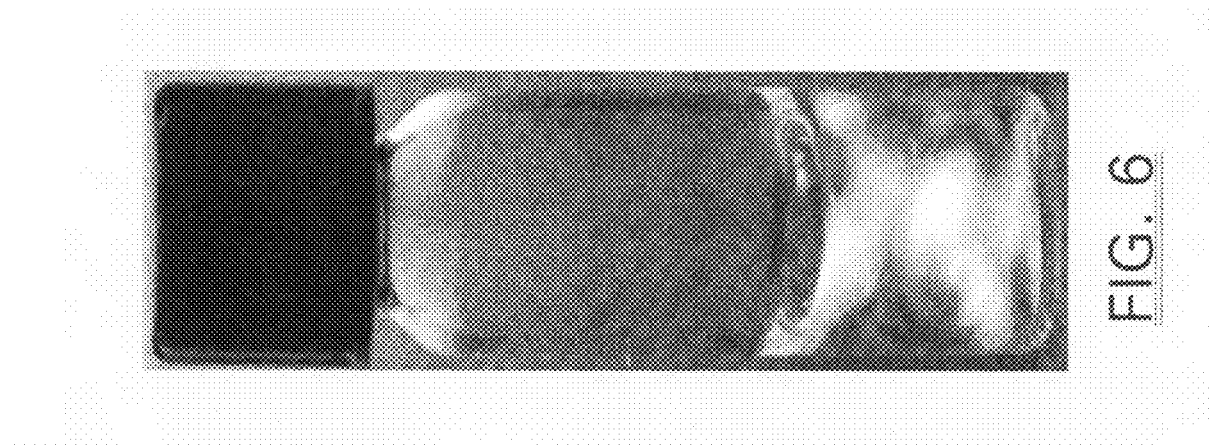
FIG. 6 is a photograph of an aqueous cellulose whisker dispersion (3.0 mg/mL, viewed through crossed polarizers) prepared by re-dispersing a supercritically dried whisker-acetone gel in water.

One or more of the water and solvent utilized to disperse the nanoparticles can include additional components such as, but not limited to, various additives such as stabilizers, monomers, polymers, surfactants, etc. As indicated herein, biorenewable nanoparticles, such as the cellulose-based whiskers, are preferred in one embodiment, and are available from a number of sources, such as wood, cotton and various animals such as tunicates. In order to illustrate the present invention, gels with a whisker content (gravimetrically determined) in the range of 1.0-1.8% w/w were explored. The whisker gel derived through exchange with acetone, hereafter referred to as acetone gel, was converted to an aerogel by supercritical fluid extraction with $CO_2$, such as described by S. Kuga, D.-Y. Kim, Y. Nishiyama, R. M. Brown, *Mol. Cryst. Liq. Cryst.* 387, 13 (2002), herein incorporated by reference, in order to explore its properties and structure. The formed aerogel was a translucent white material, see FIG. 1B, which, similar to aqueous whisker dispersions, shows birefringence due to macroscopic anisotropy, see FIG. 1C. Scanning electron microscopy (SEM) of the aerogel confirms the formation of a robust three-dimensional porous network of individualized whiskers, which is maintained through the supercritical extraction, see FIG. 1D. Under dynamic tension at 25° C., dry cellulose aerogels displayed a tensile storage modulus (E') of ca. 3.7 MPa. If compressed into a thin sheet (thickness=200 µm), E' increased to ca. 5.3 GPa. This value is in the range (3-15 GPa) reported for tunicate whisker sheets cast from aqueous dispersions, such as described by N. Ljungberg, J. Y. Cavaille, L. Heux, *Polymer* 47, 6285 (2006), matches E' of a reference film produced by casting an aqueous dispersion of the whiskers used here, 4.0 GPa, see FIG. 5, and suggests that the compacted templates adopt a structure in which the reinforcing nature of the nanofiller is fully exploited. Both as-produced and compacted cellulose aerogels could readily be re-dispersed in water to form birefringent dispersions of well-individualized whiskers, see FIG. 6, demonstrating that the mechanical properties of neat whisker assemblies are due to strong whisker-whisker interactions that result from hydrogen bonding.

In a further step, the assembled nanoparticle network is combined with a desired polymer in order to form the polymer nanocomposite. The polymer utilized is chosen so that the polymer in a solution with an appropriate solvent does not substantially re-disperse the nanoparticle network, and so that the solvent is miscible with the gel solvent. The host polymer must also be soluble in a chosen solvent, and must not dissolve the nanoparticles utilized. Many different polymers and copolymers can be utilized as a host polymer. Examples of suitable (co)polymers, i.e., polymers or copolymers, include, but are not limited to, various alkylene oxide polymers and copolymers such as ethylene oxide, propylene oxide, copolymers of ethylene oxide and epichlorohydrin and/or other monomers; a vinyl aromatic (co)polymer such as polystyrene and styrene copolymers; polyolefin polymers or copolymers such as polyethylene and polypropylene; diene polymers and copolymers, such as cis-polybutadiene; polyacrylates and acrylate copolymers, such as methyl methacrylate; polyamides; and polyester polymers or copolymers such as poly(vinyl acetate) or polycaprolactone.

Prior to incorporation into the nanoparticle network, one or more desired polymers or copolymers are dissolved in a suitable solvent. The amounts of polymer incorporated into the solvent can vary as desired. The polymer solvent can comprise auxiliary components if desired, such as, but not limited to, stabilizers, surfactants, etc., if desired. In one embodiment, the polymer solvent composition can include curatives, such as di- or poly-functional compounds, for example diisocyanate, that can be utilized to chemically crosslink nanoparticulates including functional groups, such as whiskers, thereby further strengthening the nanoparticle network. Such compatible polymer solvents are known to those of ordinary skill in the art. Examples of suitable polymer solvents include, for example, toluene, dimethyl formamide, chlorinated solvents including, but not limited to, 1,2-dichloroethane, dichloromethane, and chloroform. Other suitable polymer solvents are known to those of ordinary skill in the art. The range of polymer in the solvent in one embodiment can be from about 1 to about 40% w/v, but this dependent on the viscosity of the polymer solution and it is to be understood that the amounts can be higher or lower depending on the polymer and solvent utilized.

Figure 2A:
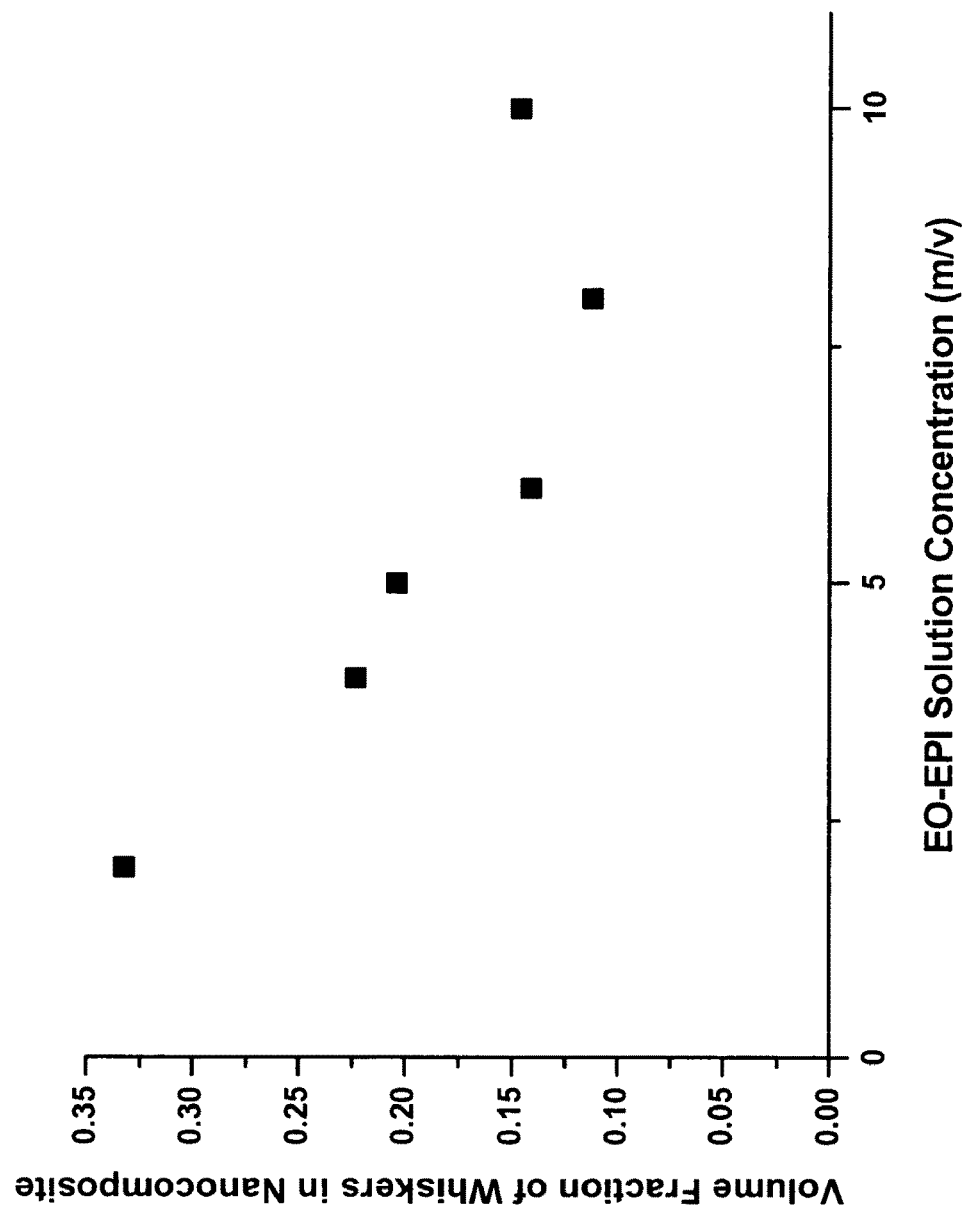
FIG. 2A shows volume fraction of cellulose whiskers in nanocomposites prepared by immersion of whisker acetone gels, of 6 mg/mL whiskers, in EO-EPI solutions in THF of a range of concentrations and subsequent compaction.
Figure 2B:
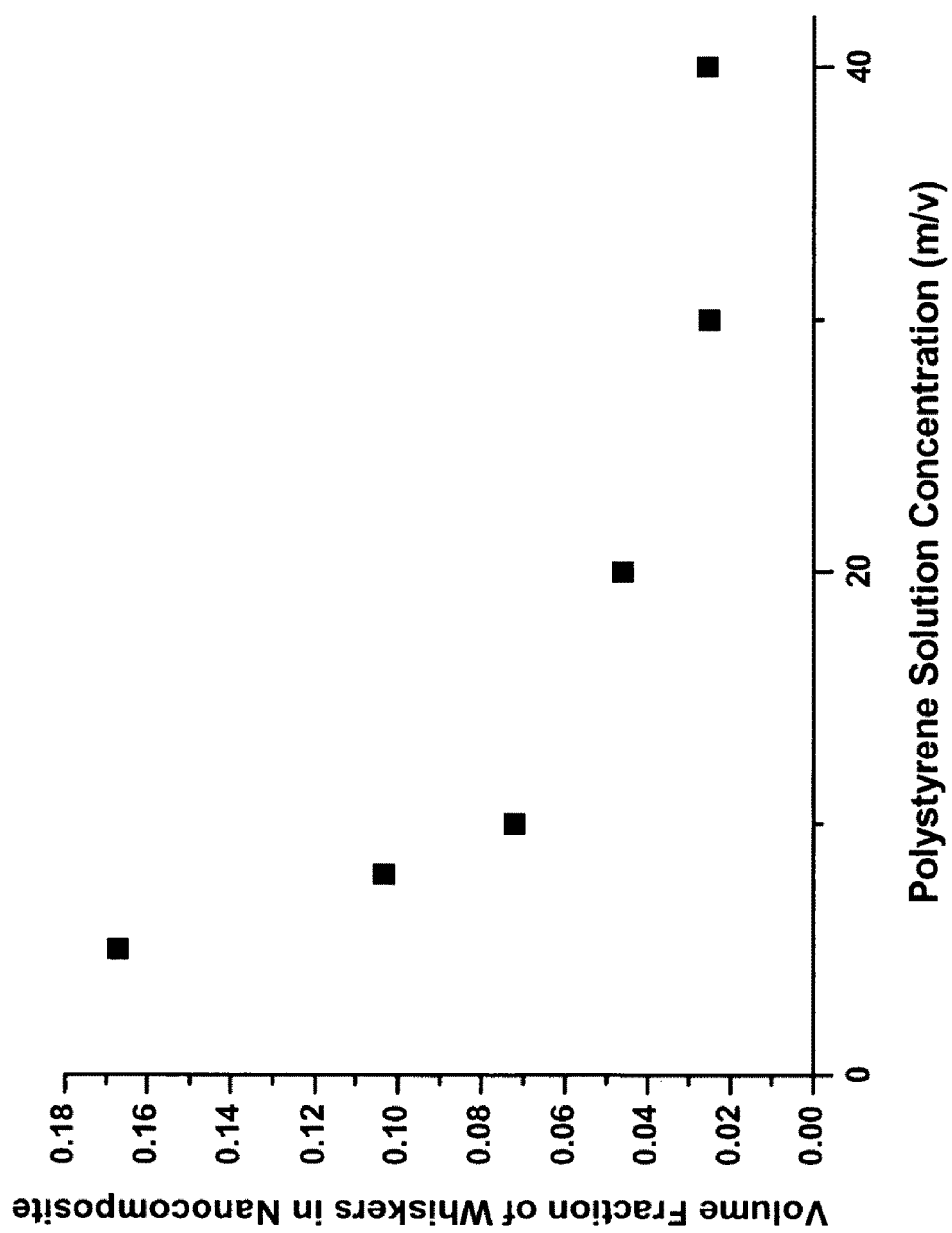
FIG. 2B shows volume fraction of cellulose whiskers in nanocomposites prepared by immersion of whisker acetone gels, of 15 mg/mL whiskers, into DCM solutions of polystyrene of a range of concentrations and subsequent compaction.
Figures 2C, 2D:
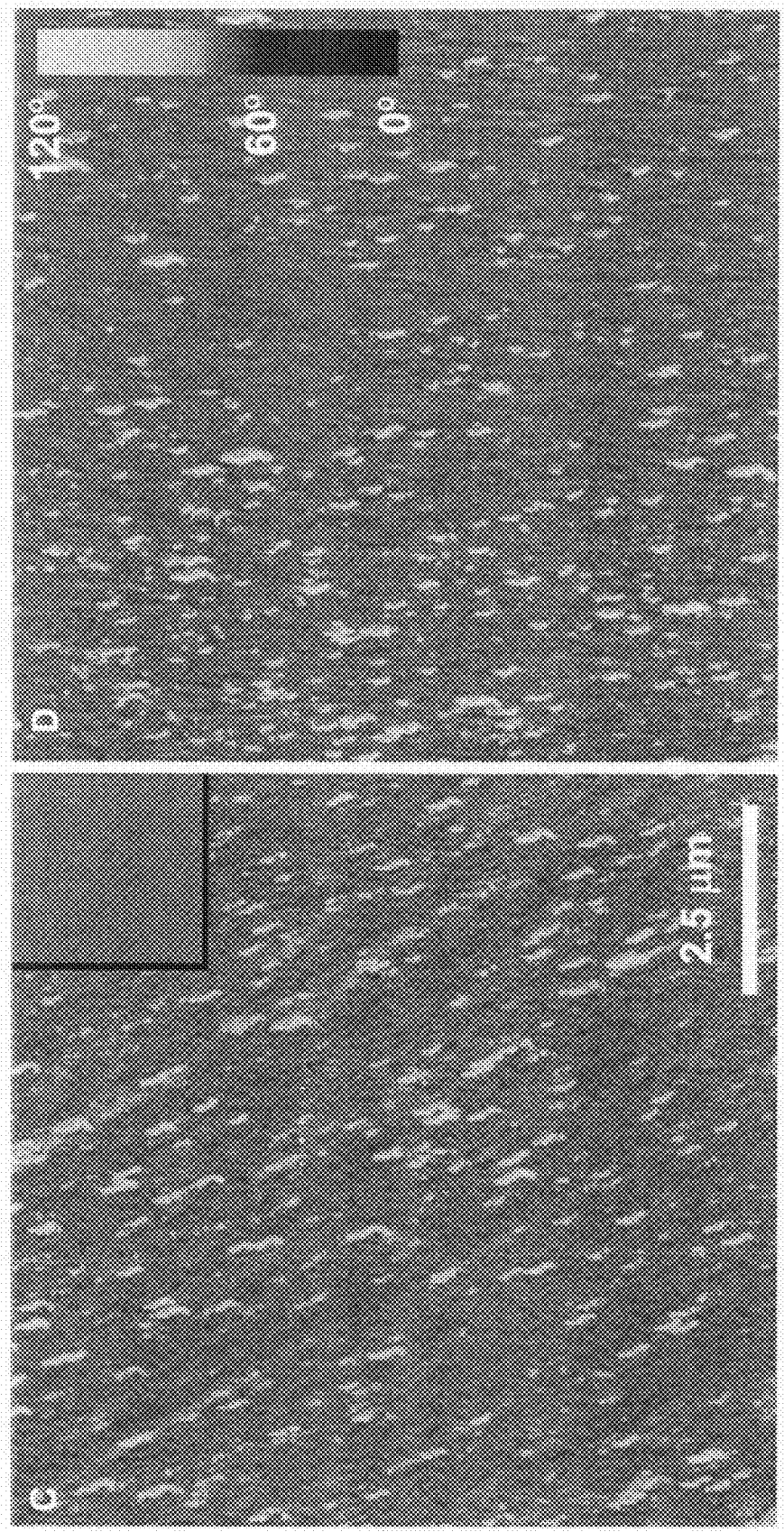
FIG. 2C shows an AFM phase image of an ultra-microtomed nanocomposite comprising 24% (v/v) whiskers in EO-EPI and an inset showing an AFM phase image of neat EO-EPI film.
FIG. 2D shows an AFM phase image of an ultra-microtomed nanocomposite comprising 7.2% (v/v) whisker in polystyrene and an inset showing an AFM phase image of neat EO-EPI film.
Figure 7:
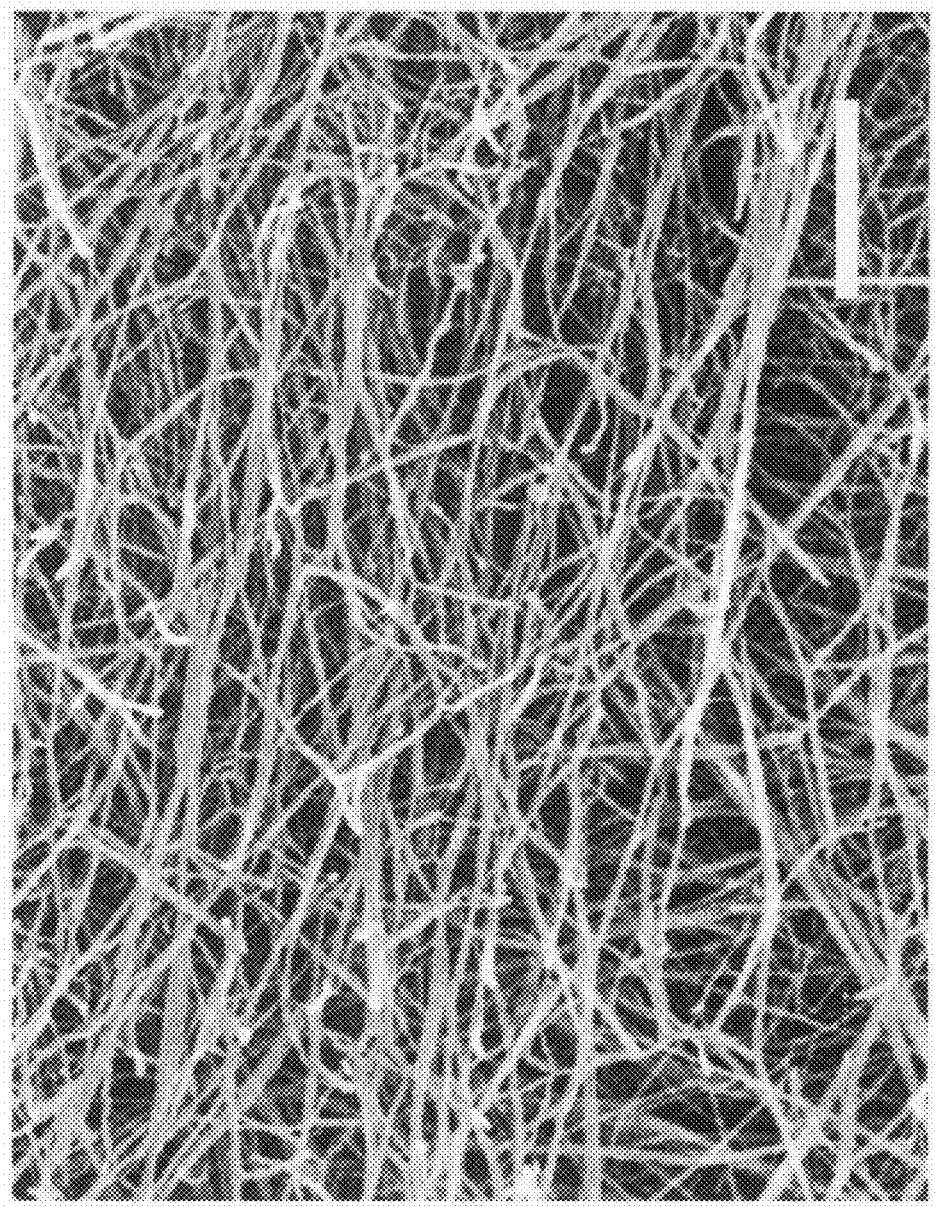
FIG. 7 is a scanning electron microscopy (SEM) image of a cellulose whisker aerogel. This reference material was prepared by immersion of an acetone gel in neat toluene as a representative non-solvent (but no polymer) for 16 hours, re-exchange of toluene against acetone for another 16 hours, and supercritical extraction with $CO_2$.

In one embodiment, the nanofiber scaffold is filled with a desired matrix polymer. This is readily accomplished by immersing the nanoparticle network containing gel, such as an acetone-nanoparticle gel—supercritical extraction is not necessary—into a solution with the targeted host polymer. The main requirement for this step is that the polymer solvent does not substantially re-disperse the nanofibers. In a reference experiment, which involved immersion of the acetone gel in neat toluene as a representative non-solvent (but no polymer), supercritical extraction with $CO_2$, and inspection by SEM, it was established that the network structure remained intact throughout this step, see FIG. 7. A 1:1 statistical copolymer of ethylene oxide and epichlorohydrin (EO-EPI) was utilized as the first host polymer. EO-EPI/whisker nanocomposites are of interest as ion-conducting materials (doped with $LiClO_4$); these composites are also accessible (although not reported before) by a conventional process (solution casting from N,N-dimethyl formamide), thus allowing for a direct evaluation of the new process. Cellulose whisker acetone gels were first imbibed with solutions of EO-EPI in tetrahydrofuran (THF). An extensive immersion time (16 hrs.) was chosen to ensure complete equilibration; this parameter was not varied here, but it should depend on the shape and size of the gel. The EO-EPI/whisker/THF gels thus produced were dried at ambient and compacted by compression molding at 80° C., see FIG. 1A. The composition of the resulting EO-EPI/whisker nanocomposites was controlled via the concentration of the polymer solutions and the whisker density of the acetone gel, see FIG. 2A, and was established gravimetrically. A broad compositional range is accessible—in the case of EO-EPI, materials comprising between 11.1 and 29.1% v/v whiskers were investigated. The diffusion rate of the polymer solution into the template is limited by its viscosity and, therefore, nanocomposites with very low whisker/high polymer content may be difficult to produce if the molecular weight of the polymer is high. To investigate the morphology of the nanocomposites, atomic force microscopy (AFM) phase images of ultra-microtomed EO-EPI/whisker nanocomposites (24% v/v whiskers) were acquired, see FIG. 2C. The AFM phase images reveal a homogeneous distribution of light spots against a darker background, which by way of reference, FIG. 2C inset, was attributed to the EO-EPI matrix. The dimensions of the lighter spots appear to correlate well with a projection of well-isolated whiskers. Overall, the images are similar to the ones observed for polyacrylic acid/cellulose composites, such as taught by Y. Huang, Y. G. Yang, J. Petermann, *Polymer* 39, 5301 (1998), and appear to support preservation of the whisker scaffold.

Figure 3A:
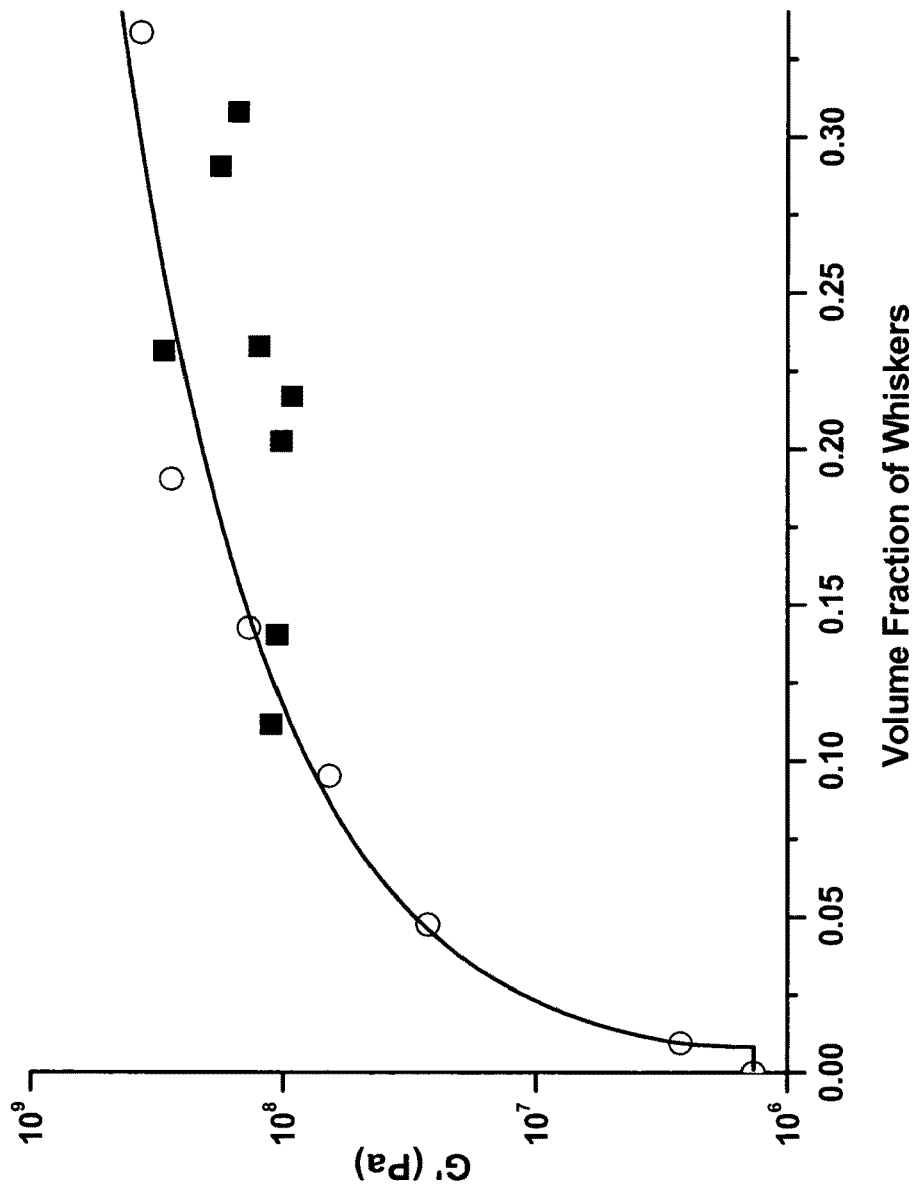
FIG. 3A shows a plot of shear moduli G' per volume fraction of cellulose whisker nanocomposites with EO-EPI at 25° C., wherein the nanocomposites were fabricated by either solution casting as indicated by open circles or the template approach as illustrated by solid squares, wherein solid lines represent predictions by the percolation model.

The most striking effect of reinforcing EO-EPI with cellulose whiskers is a dramatic change of the material's mechanical properties. The neat polymer is largely amorphous, exhibits a glass transition temperature ($T_g$) around $-43°$ C. with no observable melt temperature ($T_m$) between $20°$ C. and $120°$ C. The mechanical properties of all samples were investigated in a temperature regime of $15-45°$ C. by dynamic mechanical analysis (DMTA) in tension mode. FIG. 3A shows the shear moduli G', which were calculated from measured E' of EO-EPI/whisker nanocomposites with different whisker content at $25°$ C. For the purpose of comparison, nanocomposites were also fabricated by solution casting from a single solvent system, DMF. Gratifyingly, the G' (plotted against the volume fraction of whiskers, FIG. 3A) of samples prepared by casting from DMF and the template approach follow the same trend and materials of similar compositions are virtually indistinguishable. G' increased by almost three orders of magnitude from 1.3 MPa for the neat polymer to 300 MPa for a nanocomposite comprising 23% v/v of cellulose whiskers, see FIG. 3A. The spectacular modulus increase is 25 times higher than that observed for similar compositions processed by a mixed solvent method, as taught by M. Schroers, A. Kokil, C. Weder, *J Appl. Polym. Sci.* 93, 2883 (2004), and reflects the formation of a continuous rigid nanofiber network in which stress transfer is facilitated by hydrogen-bonding between the whiskers. The magnitude of the effect can be calculated by adapting the percolation concept to the classical parallel-series model. The shear modulus G' of the nanocomposites can be expressed as (see M. Takayanagi, S. Uemura, S. Minami, *J. Polym. Sci.* 5, 113 (1964) and N. Ouali, J. Y. Cavaille, J. perez, *Plast. Rubber Comp Process. Appl.* 16, 55 (1991)):

$$G' = \frac{(1 - 2\psi + \psi X_r)G'_s G'_r + (1 - X_r)\psi G'^2_r}{(1 - X_r)G'_r + (X_r - \psi)G'_s} \quad (1)$$

with $$\psi = X_r \left(\frac{X_r - X_c}{1 - X_c}\right)^{0.4} \quad (2)$$

where $X_r$ is the volume fraction of the rigid (whisker) component, $G'_s$ and $G'_r$ are the shear moduli of the neat soft (s, polymer) and rigid (r, whisker) constituents, and the percolating volume fraction, $\psi$, is defined as the volume fraction of whiskers that participate in the load transfer. $G'_s$ and $G'_r$ were determined from DMTA experiments of compression-molded films of the neat EO-EPI (1.3 MPa) and a dry tunicate whisker sheet prepared by compacting a supercritically dried whisker aerogel (2.0 GPa), respectively. $\psi$ can be approximated by (2) from $X_r$ and the critical volume fraction needed for percolation, $X_c$, ($X_c=0.7/f$, where f is the aspect ratio L/d=84) of the rigid fillers. In case of the whiskers used here, L/d was determined experimentally by statistical analysis of a large number of TEM images of individualized whiskers. Gratifyingly, Eq. 1 fits excellently to the experimentally determined G' values of the EO-EPI/cellulose whisker nanocomposites, see FIG. 3A. Since all parameters fed into Eq. 1 were extracted from independent measurements, and are not fitted to the data presented in FIG. 3A, this agreement is another piece of evidence for the retention of a percolating cellulose network within the polymer nanocomposites.

Figure 3B:
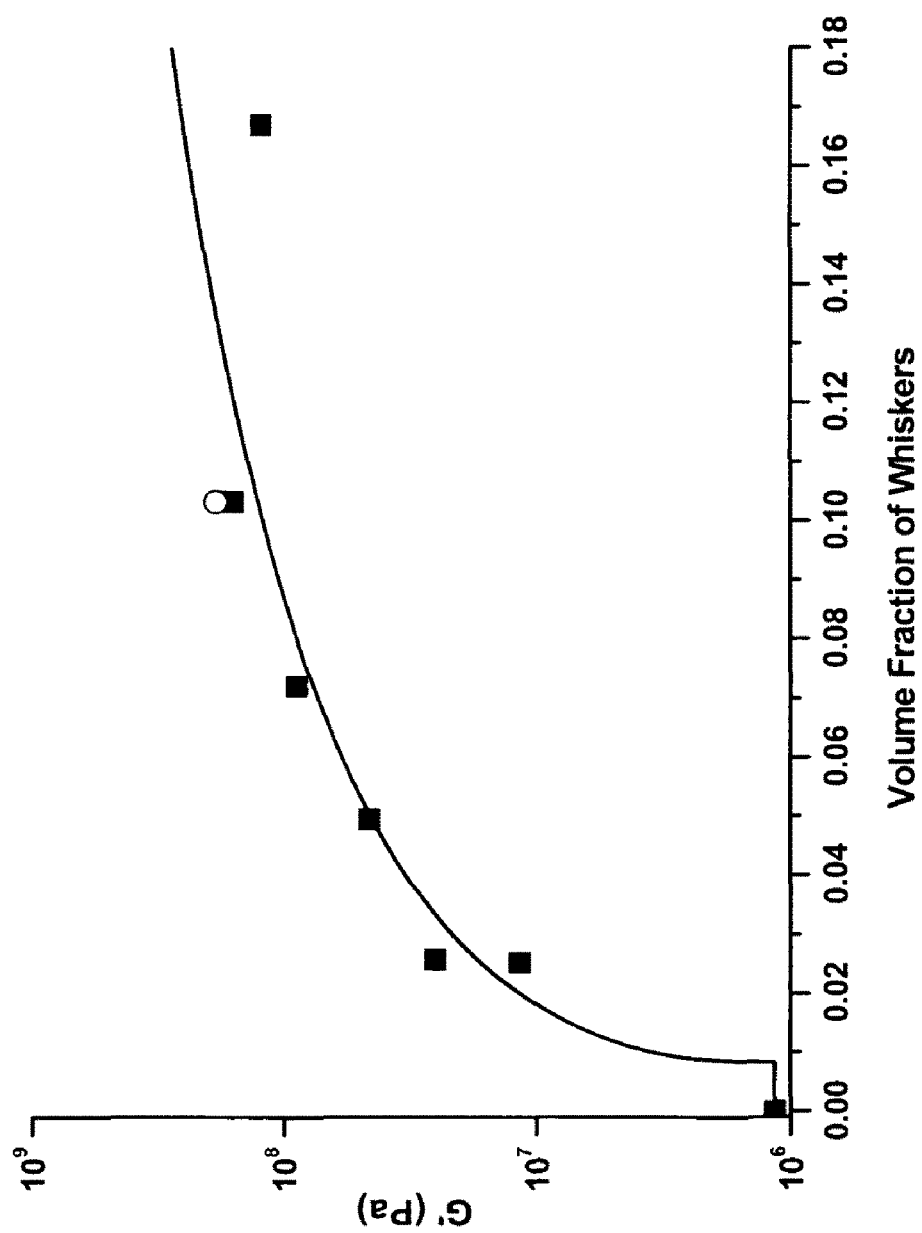
FIG. 3B shows shear moduli G' of cellulose whisker nanocomposites with polystyrene at 125° C., wherein the nanocomposites were fabricated by either solution casting as indicated by open circles or the template approach as illustrated by solid squares, wherein solid lines represent predictions by the percolation model.
Figure 8A:
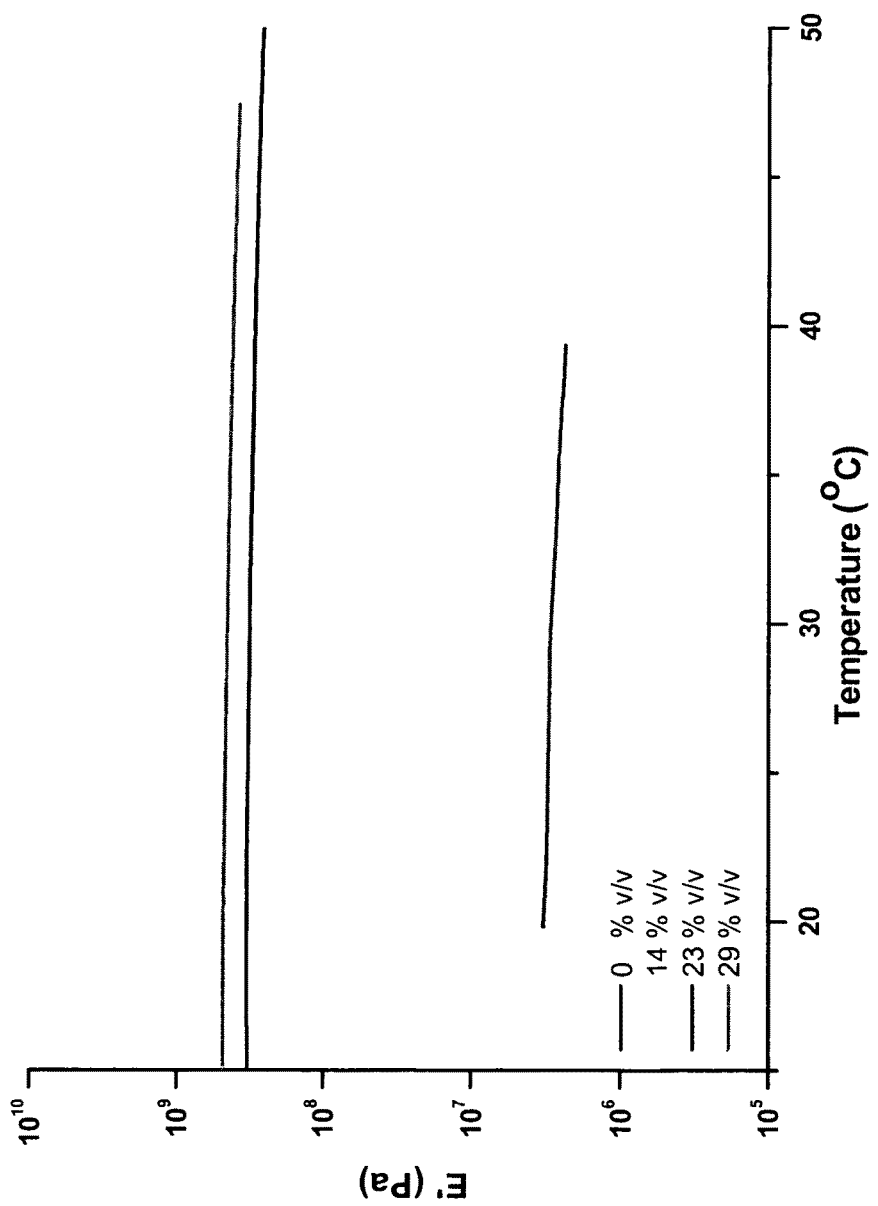
FIG. 8A shows DMTA traces of polymer/whisker nanocomposites as a function of temperature and composition for EO-EPI/whisker nanocomposites.
Figure 8B:
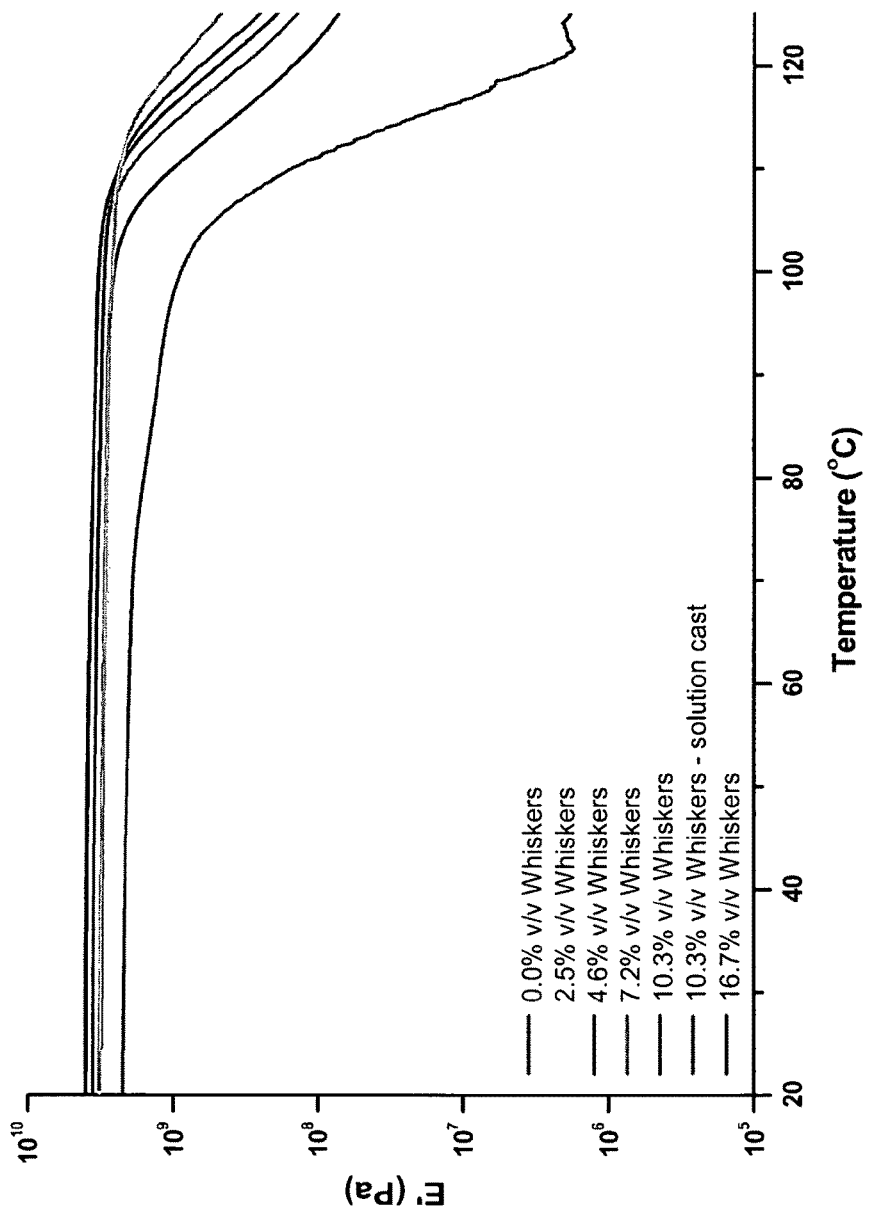
FIG. 8B shows DMTA traces of polymer/whisker nanocomposites as a function of temperature and composition for polystyrene-whisker nanocomposites containing a range of whisker densities.

To probe the versatility of the template approach, the preparation of polystyrene/whisker nanocomposites was also explored. In this case, cellulose whisker acetone gels were imbibed with dichloromethane solutions of polystyrene to create nanocomposites with a whisker content between 2.5 and 16.7% v/v, see FIG. 2B. The dried materials were compacted at $120°$ C. (above the $T_g$ of the amorphous polystyrene). Due to the high stiffness of neat polystyrene in its glassy amorphous state (G'=0.85 GPa), DMTA experiments reveal, expectedly, only a modest stiffness increase below $T_g$ (G'=1.6 GPa for a nanocomposite comprising 10.3% v/v of whiskers, see FIGS. 8A and 8B. However, a dramatic reinforcement is observed above $T_g$, as is evident from the shear moduli G' at $125°$ C. shown in FIG. 3B. Also in this case, the experimental data match exceptionally well with the percolation model for nanocomposite reinforcement with cellulose whiskers, indicating the preservation of the whisker scaffold, as also confirmed by AFM phase images of this system, see FIG. 2D. Polystyrene whisker nanocomposites can also be prepared by casting from DMF. Also in this case, the materials match the properties of those produced by the template approach. see FIG. 3B, evidencing broader applicability of the template approach.

Figure 3C:
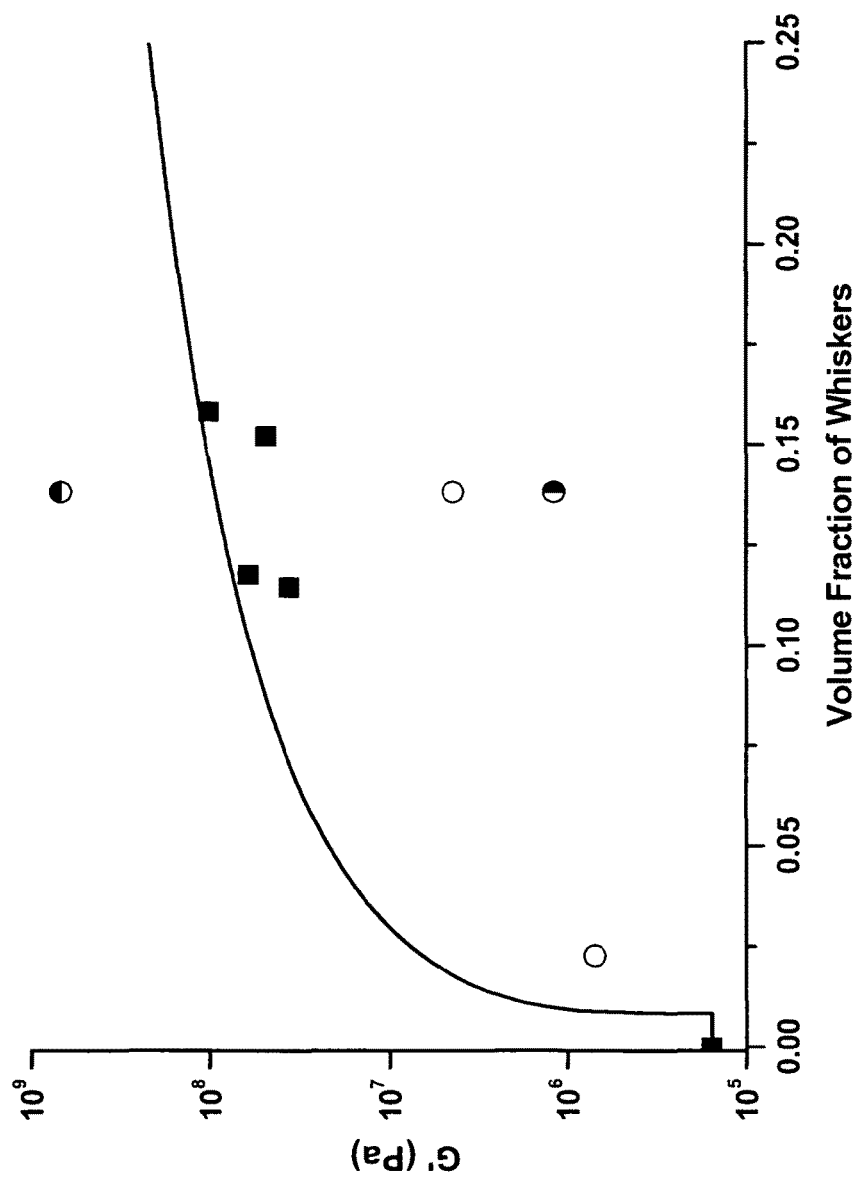
FIG. 3C shows shear moduli G' of cellulose whisker nanocomposites with PBD at 25° C., wherein the nanocomposites were fabricated by either solution casting as indicated by open circles or the template approach as illustrated by solid squares, wherein solid lines represent predictions by the percolation model, and wherein in the case of inhomogeneous, solution-cast samples, vertically shaded circles represent data from transparent portions of the film, while horizontally shaded circles refer to opaque samples.
Figure 9:
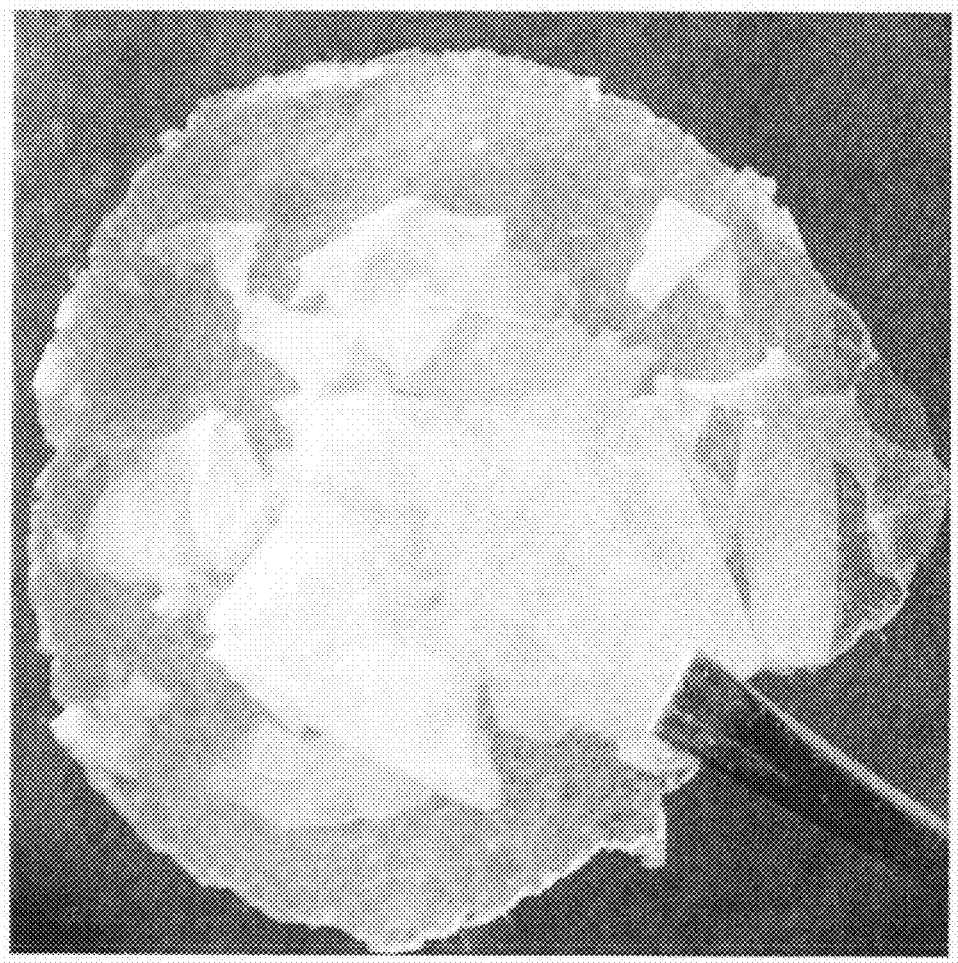
FIG. 9 is a photograph of a PBD/whisker nanocomposite containing 13.8% v/v whiskers prepared by solution casting from a toluene/DMF mixture and subsequent compression molding. Opaque portions are rich in whiskers, while transparent portions consist mainly of PBD.

It was hitherto believed impossible to incorporate cellulose whiskers into highly non-polar polymers such as polypropylene, see N. Ljungberg, J. Y. Cavaille, L. Heux, *Polymer* 47, 6285 (2006), or polybutadiene without surface modification or surfactants. Both of these approaches, however, reduce the whisker-whisker interactions, and were reported to lead to limitations of the mechanical reinforcement effect. Probably the most important feature of the template approach is its capability to make percolating nanocomposites of otherwise immiscible components accessible. This was demonstrated by fabricating nanocomposites of rubbery amorphous ($T_g=-102°$ C.) cis-polybutadiene (PBD) and cellulose whiskers using the template approach. Due to the high molecular weight of the PBD (weight-average molecular weight $M_w=2,000,000-3,000,000$), the viscosity of the PBD toluene solutions used for the process was exceedingly high and prevented the fabrication of nanocomposites with a whisker concentration of lower than 11.5% v/v. The materials thus produced display the expected reinforcement and the experimental results agree well with the percolation model, as is evident from the shear moduli G' at $25°$ C. shown in FIG. 3C. Reference PBD/whisker nanocomposites produced by solution casting mixtures of DMF whisker dispersions and toluene solutions of PBD resulted in heterogeneous films, which (at least at high whisker densities) exhibit macroscopic phase separation, see FIG. 9. DMTA measurements confirmed a significant variation of G' of such solution-cast PBD/whisker reference nanocomposites and reflect the heterogeneity of materials produced in this manner, see FIG. 3C.

In order to further illustrate the template approach of the present invention, carbon nanotubes were also evaluated as a nanoparticulate filler in a further embodiment. An aqueous dispersion of polyaminobenzene sulfonic acid functionalized carbon nanotubes was converted into an acetone gel using the here-described solvent exchange process and the gels were immersed in dichloromethane solutions of polystyrene, dried, and compressed in analogy to the polystyrene/whisker nanocomposites. DMTA measurements of the resulting polystyrene/carbon nanotube nanocomposites (5.5% w/w CNT) confirmed a significant mechanical reinforcement of the PS matrix. At 125° C. (above $T_g$) G' was increased more than 25 fold (18.5 vs. 0.7 MPa) over the neat polystyrene, confirming that the template process is applicable to nanoparticles other than cellulose whiskers.

In a further embodiment, two or more same or different monomers are dissolved or dispersed in the polymer solvent, optionally with a (co)polymer, prior to combining with the nanoparticle network. For example, styrene monomers can be dispersed in dichloromethane and added to a nanoparticle gel including whiskers prior to polymerizing with radical, cationic, or anionic conditions initiated with heat or ultraviolet light or other methods known to those of ordinary skill in the art, for example.

The generally two-step process for preparing the nanocomposite can also be preferred in a single step. Dispersions of whiskers in polar protic or polar aprotic solvents including, but not limited to, one or more of dimethyl formamide, dimethyl sulfoxide, m-cresol, formic acid, and N-methyl pyrrolidone, can be combined with miscible non-solvents including, but not limited to benzene, carbon tetrachloride, chloroform, cyclohexane, 1,2-dichloroethane, dichloromethane, ethyl acetate, ethyl ether, butanol, toluene, pentane, tetrahydrofuran or, methyl ethyl ketone. The non-solvent may or may not contain a (co)polymer and/or one or more monomers. Non-solvents without polymer in solution offer the ability to rapidly form gels, while non-solvents solutions with polymer, copolymer, or monomers offer the ability of a one step polymer-filled whisker organogel for the fabrication of nanocomposites. In one embodiment, nanoparticle-containing gels can be made more rapidly by adding the nanoparticle dispersion to the non-solvent, and generally smaller gel particles can be formed. In one embodiment, an aqueous dispersion of the nanoparticles can be sprayed into a non-solvent, such as acetone, wherein lower density gel particles can be formed.

For example, nanoparticle-containing gels can be formed from dimethyl formamide dispersions and methylene_chloride as a non-solvent. In one embodiment, the nanoparticle dimethyl formamide dispersion is poured into the methylene chloride non-solvent. In a further embodiment, the nanoparticles dispersed in an organic medium, such as dimethyl formamide can be added directly to the solution containing the dissolved polymer, such as polystyrene and methylene chloride. The resulting nanoparticle polymer composites demonstrate mechanical properties comparable to the slower polymer diffusion process. Other combinations of components, such as described herein, can be utilized.

The ability to produce polymer nanocomposites, which comprise a percolating, three-dimensional network of well-individualized nanofibers, is important to diverse areas of polymer science. Reporting on nanocomposites that comprise cellulose nanofibers and carbon nanotubes, a simple methodology has been demonstrated that solves this problem and is applicable to previously incompatible components. The materials reported display significantly improved mechanical properties and are of interest in their own right. As can be recognized by those of ordinary skill in the art, the template approach is broadly applicable to other materials systems, and promises to significantly expand the library of readily-accessible polymer/nanofiber composites.

The experimental procedures for the various embodiments identified hereinabove were as follows.

Cellulose Whiskers Derived from Tunicates. Sulfate functionalized cellulose whiskers were prepared as previously described, see O. van den Berg, J. R. Capadona, C. Weder, Biomacromolecules 8, (2007), herein incorporated by reference; the protocol is briefly summarized here. The tunicates were gutted, and the harder sections of their mantels were removed for homogeneity. The incrustations on the surface of the tunicates were removed by repeated treatments of mechanical agitation, scrubbing, and heating in a 5% w/w potassium hydroxide solution (80° C., 24 hours; this protocol is a slight modification to a procedure reported by H. Yuan, Y. Nishiyama, M. Wada, S. Kuga, Biomacromolecules 7, 696 (2006). After excessive rinsing with water to reach a neutral pH, the tunicate mantels (500 g) were placed in water (3 L) with acetic acid (5 mL) and sodium hypochlorite (10 mL, >4% chlorine), and the mixture was heated to 60° C. In 1 hour intervals, additional portions of acetic acid (5 mL) and sodium hypochlorite solution (10 mL) were added until the material's color changed from pinkish to white. Next, the bleached de-proteinized walls were washed with de-ionized water and disintegrated with a Waring blender, yielding a fine cellulose pulp. The pulp was hydrolyzed with sulfuric acid according to the method described by V. Favier, G. R. Canova, S. C. Shrivastava, J. Y. Cavaille, Poly. Eng. Sci. 37, 1732 (1997), V. Favier et al., Polym. Adv. Technol. 6, 351 (1995) and V. Favier, H. Chanzy, J. Y. Cavaille, Macromolecules 28, 6365 (1995) with slight modifications. Sulfuric acid (98%, 960 mL) was slowly added under vigorous mechanical stirring to a cooled suspension of tunicate cellulose pulp in de-ionized water (600 mL, 0° C.). Subsequently, the dispersion was heated (60° C., 90 min) under continued stirring. The dispersion was then cooled to 0° C., filtered over a small-pore fritted glass filter, and washed with de-ionized water until the pH was neutral. The resulting whiskers were then dialyzed in two to three successive 24 hr treatments with de-ionized water to remove any remaining salts. Finally, the whiskers were re-dispersed in de-ionized water (~4 g in 500 mL) by overnight sonication, and water was added to adjust the concentration to 8 mg/mL. Whiskers used for fabrication of solution-cast nanocomposites were frozen in an acetone/dry-ice cooled stainless steel container, and subsequently lyophilized. The size of the as-prepared whiskers was established by image analysis of TEMs as follows: diameter=26.0±3.0 nm; length=2.20±0.20 µm (2), resulting in an aspect ratio L/d=84.

Formation of Cellulose Whisker Organogels. Whisker organogels were prepared from aqueous dispersions using a solvent-exchange sol-gel process in which gelation was induced through addition of a water miscible non-solvent to the whisker dispersion. All materials prepared were fabricated from gels prepared by the addition of acetone, referred to as "acetone gels". A typical example of the fabrication of an acetone gel is described here. First, the aqueous whiskers dispersion (150 mL, 8.0 mg/mL) was heated to a gentle boil in a large beaker (1000 mL), followed by brief sonication to remove air bubbles. After cooling to room temperature (RT), acetone (850 mL) was gently added on top of the aqueous whisker dispersion, avoiding mixing and forming an organic layer on top of the aqueous dispersion. The organic layer was exchanged 1-2 times daily, until the bottom portion had assembled into a mechanically coherent whisker-acetone gel (typically 5-7 days). During that process, the acetone layer was gently agitated to facilitate the solvent exchange. When solvent exchange was no longer visible (refractive index gradients at the sol/gel interface), the acetone gel was released from the glass beaker, and solvent exchanged two times more with dry acetone.

Similar organogels were also prepared by using acetonitrile, ethanol, methanol, isopropanol, or tetrahydrofuran instead of acetone. These organogels, and also a small-scale version of the acetone gel, were prepared in 20 mL vials with 3.0 mL of whisker suspension and 15 mL solvent.

Determination of Whisker Content in Organogels. The whisker content of the various organogels was determined gravimetrically. Gels were prepared by solvent exchange between an aqueous dispersion containing 0.8% w/w of cellulose whiskers (3 mL) with organic solvents as indicated (15 mL) according to the above protocol. The gels were weighted in their swollen and dried state and the whisker to total weight ratio was determined as an average of at least 3 independently prepared samples. The results are compiled in Table 1. The whisker content of acetone gels produced in larger scale (vide supra) for the preparation of nanocomposites was determined in a similar manner; the whisker content of the gel was varied between 6 and 40 mg/mL by variation of the aqueous dispersion:acetone ratio. A general trend of increased gel density is observed when changing the solvent from methanol, to ethanol, to isopropanol, and may be related to the solvation energy of the non-solvent.

Preparation and SEM Analysis of Whisker Aerogels. To explore its properties and structure, a whisker acetone gel (whisker density of 15 mg/mL) was converted into an aerogel by supercritical fluid extraction with $CO_2$ (Applied Separations, 1 L autoclave chamber). The solvent was exchanged with liquid $CO_2$ (100 bar, 25° C. in five 120 minute cycles), and then heated to (215 bar, 45° C.) convert the $CO_2$ to a supercritical state. Slow venting of the chamber at a controlled rate (2.25 L/min) produced the desired aerogel. Samples used for scanning electron microscopy (SEM) analysis were coated with gold and microscopy was conducted with a Hitachi S-4700 field-emission microscope.

A sample was compression-molded in a Carver laboratory press (RT at 6000 psi for 30 s) to yield a ca. 200 µm thin cellulose whisker film.

Fabrication of Cellulose Whisker Film by Solution Casting. An aqueous dispersion containing 0.8% w/w of cellulose whiskers (3 mL) whiskers was cast into a Teflon® petri dish, which was placed into a vacuum oven (60° C., 15 mbar, 48 hours) to evaporate the water and dry the resulting film, which had a thickness of ca. 70 µm.

Fabrication of EO-EPI/Whisker Nanocomposites by Solution Casting. Lyophilized whiskers were dispersed in dimethyl formamide (DMF) at a concentration 5 mg/mL as previously described. The EO-EPI copolymer was dissolved in DMF (5% w/w) by stirring the copolymer in dry DMF for two days. Nanocomposites were prepared by combining the desired amounts (to yield nanocomposites containing between 0.9% and 33.3% v/v whiskers) of the colloidal whisker dispersion and polymer solution (both in DMF), and solution-casting the resulting homogeneous mixture into Teflon® petri dishes. The dishes were placed into a vacuum oven (60° C., 15 mbar, 48 hours) to evaporate the solvent and dry the resulting films, before the material was compression-molded between spacers in a Carver laboratory press (80° C. at 6000 psi for 2 min) to yield 300-400 µm thin nanocomposite films.

Fabrication of EO-EPI/Whisker Nanocomposites by Template Approach. Cellulose whisker acetone gels, prepared as described above (comprising 6 or 14 mg/mL whiskers) were placed at RT into solutions containing various concentrations of EO-EPI copolymer in tetrahydrofuran (THF, polymer concentration=1-25% w/w) for for 16 hours. The gels were subsequently removed from the polymer solution, dried at ambient for up to 2 hours to remove (most of) the solvent, before the material was compression-molded between spacers in a Carver laboratory press (80° C. at 6000 psi for 2 min.) to yield 300-400 µm thin nanocomposite films. The whisker content within the nanocomposite was determined gravimetrically from the weights of the wet acetone gel and the final nanocomposite.

Fabrication of PS/Whisker Nanocomposites by Solution Casting. Lyophilized whiskers were dispersed in dimethyl formamide (DMF) at a concentration 3.1 mg/mL as previously described. The polystyrene was dissolved in dry DMF (5% w/w) by stirring for 16 hours. Nanocomposites were prepared by combining appropriate amounts (to yield a nanocomposite containing 10.3% v/v whiskers) of the colloidal whisker dispersion and the polymer solution (both in DMF), and solution-casting the resulting homogeneous mixture into a Teflon® petri dish. The dish was placed into a vacuum oven (60° C., 15 mbar, 48 hours) to evaporate the solvent and dry the resulting film, before the material was compression-molded between spacers in a Carver laboratory press (120° C. at 6000 psi for 2 min.) to yield a 400 µm thin nanocomposite film.

Fabrication of PS/Whisker Nanocomposites by Template Approach. Cellulose whisker acetone gels, prepared as described above (comprising 15 mg/mL whiskers) were placed at RT into solutions containing various concentrations of polystyrene in DCM (polymer concentration=5-40% w/v) for 16 h. The gels were subsequently removed from the polymer solution, dried at ambient for up to 2 hours to remove (most of) the solvent, before the material was compression-molded between spacers in a Carver laboratory press (120° C. at 6000 psi for 2 min) to yield 300-400 µm thin nanocomposite films. The whisker content within the nanocomposite was determined gravimetrically from the weights of the wet acetone gel and the final nanocomposite.

Fabrication of PBD/Whisker Nanocomposites by Solution Casting. Lyophilized whiskers were dispersed in DMF at a concentration 3.1 mg/mL as previously described. The PBD was dissolved in toluene (~5% w/v, 45.7 mg/mL) by stirring for 16 hours. Nanocomposites were prepared by combining appropriate amounts of the whisker suspension and PBD solution under vigorous stirring (the PBD rapidly precipitated upon mixing), to produce nanocomposites containing 3.3% or 20.0% w/w whiskers. The mixtures were cast into Teflon® petri dishes and placed into a vacuum oven (80° C., 15 mbar, 24 hours) to evaporate the solvent and dry the resulting films, before the materials were compression-molded between spacers in a Carver laboratory press (80° C. at 6000 psi for 2 min.) to yield 460 µm thin nanocomposite films. The 20.0% w/w whisker nanocomposite appeared heterogeneous to the unassisted eye, see FIG. 9.

Fabrication of PBD/Whisker Nanocomposites by Template Approach. Cellulose whisker acetone gels, prepared as described above (comprising 15 mg/mL whiskers) were placed at RT into solutions containing various concentrations of PBD in toluene (polymer concentration=1-30% w/v) for 16 hours. The gels were subsequently removed from the polymer solution, sliced into pieces to facilitate rapid solvent evaporation, and dried at ambient for up to 2 hours to remove (most of) the solvent, before the material was compression-molded between spacers in a Carver laboratory press (80° C. at 6000 psi for 2 min) to yield 460 µm thin nanocomposite films. The whisker content of the nanocomposite was determined gravimetrically from the weights of the wet acetone gels and the final nanocomposites. Due to the high molecular weight of the PBD, solutions above 15% w/v polymer in toluene proved to be too viscous for appropriate polymer diffusion, and low-whisker density films were difficult to obtain.

Formation of Carbon Nanotube (CNT) Organogels. Carbon nanotube organogels were prepared from aqueous dispersions using a solvent-exchange sol-gel process in which gelation was induced through addition of a water miscible non-solvent (acetone) to the carbon nanotube dispersion, analogously to the whisker system. First, carbon nanotubes (single-walled, polyaminobenzene sulfonic acid functionalized) were dispersed in water following the manufacturer's protocol. Briefly, carbon nanotubes (26.2 mg) were added to a glass vial containing nanopure water (1.05 mL), and sonicated (30 min). An additional volume of water (4.19 mL) was subsequently added and the mixture was sonicated for 48 hours until no more sedimentation was observed. A typical example of the fabrication of a carbon nanotube acetone gel is as follows: the aqueous carbon nanotube dispersion (~2.5 mL) was placed into a 20 mL vial, and acetone (15 mL) was gently added on top of the aqueous whisker dispersion. Unlike the whisker systems described above, some mixing proved difficult to avoid, perhaps due to the lower viscosity of the carbon nanotube dispersion. However, a carbon nanotube-free organic layer was formed on top of the aqueous dispersion, clearly indicated by the absence of coloration. This layered system was left to stand until the lower portion had assembled into a mechanically coherent carbon nanotube-acetone gel (typically 5-7 days). The acetone gels thus produced were released from the glass vials and the carbon nanotube content of the gel was determined gravimetrically.

Fabrication of PS/CNT Nanocomposites by Template Approach. Carbon nanotube acetone gels, prepared as described above, were placed at RT into solutions containing various concentrations of polystyrene in DCM (polymer concentration=5, or 10% w/v) for 16 hours. The gels were subsequently removed from the polymer solutions, dried at ambient for up to 2 hours to remove (most of) the solvent, before the materials were compression-molded between spacers in a Carver laboratory press (120° C. at 6000 psi for 2 min) to yield 300-400 μm thin nanocomposite films. The carbon nanotube content within the nanocomposite was determined gravimetrically from the weights of the wet acetone gels and the final nanocomposites.

Atomic Force Microscopy (AFM). A Dimension 3100 AFM by Digital Instruments was used to acquire phase images in tapping mode. All micrographs are presented in top-view, with no filtering to insure that all images were produced in the same quality that they were acquired. Samples of neat EO-EPI, and whisker nanocomposites created using the template method (24% v/v whiskers/EO-EPI, and 7.2% v/v whisker/PS) were embedded into epoxy resin, and trimmed with an ultramicrotome to obtain smooth surfaces for AFM analysis.

Dynamic Mechanical Thermo Analyses (DMTA). DMTA measurements were performed on rectangular films of EO-EPI and polystyrene nanocomposites using a TA Instruments DMA 2980 in tensile mode with an oscillation frequency of 1 Hz, a static force of 10 mN, an oscillation amplitude of 15.0 μm, and an automatic tension setting of 125%. Measurements were carried out at a heating rate of 3°/min (range of 15-45° C. for EO-EPI composites, and 20-130° C. for polystyrene composites);

Conversion from E' to G'. Shear storage moduli (G') were calculated from tensile storage moduli (E'), which were experimentally determined by DMTA as described above, utilizing the well-known relation: $E'=2G'(v+1)$, as shown in J. M. Gere, S. P. Timoshenko, *Mechanics of Materials*, $3^{dr}$ ed. (1990), where v is the Poisson's ratio, 0.3.

In accordance with the patent statutes, the best mode and preferred embodiment have been set forth; the scope of the invention is not limited thereto, but rather by the scope of the attached claims.

What is claimed is:

1. A method for forming a polymer nanocomposite, comprising the steps of:

forming a nanoparticle dispersion in a medium;
forming a nanoparticle-containing gel from the nanoparticle dispersion utilizing solvent exchange to replace the medium with a solvent that is medium-miscible, wherein the gel comprises a nanoparticle network; and
forming the polymer nanocomposite comprising the steps of combining the nanoparticle-containing gel with a solution including a dissolved matrix polymer and a second solvent miscible with the gel solvent and drying the composition.

2. The method for forming a polymer nanocomposite according to claim 1, wherein dispersion of the nanoparticles includes the use of sonication, stirring or high shear mixing or a combination thereof.

3. The method for forming a polymer nanocomposite according to claim 1, wherein the nanoparticles include one or more of nanofibers, carbon nanotubes and platelet materials.

4. The method for forming a polymer nanocomposite according to claim 3, wherein the medium is water, and wherein a water-miscible solvent is utilized in forming said gel.

5. The method for forming a polymer nanocomposite according to claim 4, wherein the matrix polymer is dissolved in the second solvent which does not substantially re-disperse the nanoparticle network.

6. The method for forming a polymer nanocomposite according to claim 5, wherein the matrix polymer is an alkylene oxide polymer or copolymer, a vinyl aromatic polymer or copolymer, a polyolefin polymer or copolymer, a diene polymer or copolymer, an acrylate polymer or copolymer, a polyester, or a polyamide, or a combination thereof.

7. The method for forming a polymer nanocomposite according to claim 1, wherein a poly-functional compound is included in the process in order to form a crosslinked nanoparticle network.

8. The method for forming a polymer nanocomposite according to claim 1, wherein the aspect ratio (L/d) of the nanoparticles is about 5 or more.

9. The method of forming a polymer nanocomposite according to claim 1, wherein the medium is a polar protic or aprotic solvent and a miscible non-solvent is added prior to forming the nanoparticle-containing gel.

10. The method of forming a polymer nanocomposite according to claim 9, wherein the polar protic or aprotic solvent is one or more of dimethyl formamide, dimethyl sulfoxide, m-cresol, formic acid, and N-methylpyrrolidone, and wherein the miscible non-solvent is one or more of benzene, carbon tetrachloride, chloroform, cyclohexane, 1,2-dichloroethane, dichloromethane, ethyl acetate, ethyl ether, butanol, toluene, pentane, tetrahydrofuran and methyl ethyl ketone.

11. A nanoparticle polymer composite, comprising:
a nanoparticle network incorporated into a host matrix polymer wherein the nanoparticle network consists of cellulose nanofibers, wherein the nanoparticle network is derived from a nanoparticle-containing gel formed from a nanoparticle dispersion, wherein the nanoparticle dispersion comprises nanoparticles and a medium, wherein the nanoparticle-containing gel is combined with a solution including a matrix polymer to form the nanoparticle polymer composite, wherein a poly-functional compound is included in the solution in order to form a crosslinked nanoparticle network.

12. The composite according to claim 11, wherein dispersion of the nanoparticles includes the use of sonication, stirring or high shear mixing or a combination thereof.

13. The composite according to claim 11, wherein the cellulose nanofibers are cellulose whiskers.

14. The composite according to claim 13, wherein the medium is water, and wherein a water-miscible solvent is utilized in forming said gel.

15. The composite according to claim 14, wherein the matrix polymer is dissolved in a second solvent which does not substantially re-disperse the nanoparticle network.

16. The composite according to claim 15, wherein the matrix polymer is an alkylene oxide polymer or copolymer, a vinyl aromatic polymer or copolymer, a polyolefin polymer or copolymer, a diene polymer or copolymer, an acrylate polymer or copolymer, a polyester, or a polyamide, or a combination thereof.

17. The composite according to claim 11, wherein the aspect ratio (L/d) of the nanoparticles is about 5 or more.

18. The composite according to claim 11, wherein the medium is a polar protic or aprotic solvent and a miscible non-solvent is added prior to forming the nanoparticle-containing gel.

19. The composite according to claim 18, wherein the polar protic or aprotic solvent is one or more of dimethyl formamide, dimethyl sulfoxide, m-cresol, formic acid, and N-methylpyrrolidone, and wherein the miscible non-solvent is one or more of benzene, carbon tetrachloride, chloroform, cyclohexane, 1,2-dichloroethane, dichloromethane, ethyl acetate, ethyl ether, butanol, toluene, pentane, tetrahydrofuran and methyl ethyl ketone.

20. The composite according to claim 11, wherein the nanoparticle composite has a greater tensile or shear modulus or both when compared to the matrix polymer alone, and wherein the aspect ratio (L/d) of the nanoparticles is 10 or more.

* * * * *